(12) United States Patent
Svensson (10) Patent No.: US 12,345,283 B2
(45) Date of Patent: Jul. 1, 2025

(54) STATIC LOAD COMPRESSION SPRING

(71) Applicant: Välinge Innovation AB, Viken (SE)

(72) Inventor: Johan Svensson, Kattarp (SE)

(73) Assignee: VÄLINGE INNOVATION AB, Viken (SE)

( * ) Notice: Subject to any disclaimer, the term of this patent is extended or adjusted under 35 U.S.C. 154(b) by 604 days.

(21) Appl. No.: 17/710,055

(22) Filed: Mar. 31, 2022

(65) Prior Publication Data

US 2022/0397144 A1  Dec. 15, 2022

(30) Foreign Application Priority Data

Jun. 11, 2021 (SE) .................................... 21507538

(51) Int. Cl.
*F16B 12/24* (2006.01)
*A47B 96/00* (2006.01)

(52) U.S. Cl.
CPC .............. *F16B 12/24* (2013.01); *A47B 96/00* (2013.01); *A47B 2230/07* (2013.01)

(58) Field of Classification Search
CPC .......... A47B 47/072; A47B 2230/0029; A47B 2230/07; A47B 47/042; F16B 5/0024; F16B 5/0084; F16B 5/0088; F16B 5/0614; F16B 12/10; F16B 12/12; F16B 12/24; F16B 12/26; F16B 12/46; F16B 2012/103; F16B 2200/69; F16B 2200/71; F16F 1/40; F16F 2230/36; Y10S 411/907; Y10S 411/908; Y10T 403/58; Y10T 403/581; Y10T 403/583; Y10T 403/585; Y10T 403/587

(Continued)

(56) References Cited

U.S. PATENT DOCUMENTS 2,171,185 A    8/1939  Maier
3,150,506 A *  9/1964  Alcaro ...................... F16D 3/72
                                                         464/78

(Continued)

FOREIGN PATENT DOCUMENTS

CA    3098285 A    10/2019
DE    2143798 A1    3/1973

(Continued)

OTHER PUBLICATIONS

U.S. Appl. No. 18/764,217, Thomas Meijer, filed Jul. 4, 2024.

(Continued)

*Primary Examiner* — Josh Skroupa
(74) *Attorney, Agent, or Firm* — Boone IP Law (57) ABSTRACT

A locking device which includes static load spring and a locking pin for locking two components to one another, is a sequence of a first and a second elements. Each element includes a disc-shaped part, wherein two relative the centre of the disc-shaped part opposed bridging struts are arranged equally distanced from the centre and on the same side of the disc-shaped part. The elements with said struts are arranged with the disc-shaped parts parallel to one another, and wherein the first element with the struts directed towards the second element is connected with said struts to the second element, with the struts of the second element pointing away from the first element. A line between the struts of the first element is perpendicular to a line between the struts of the second element.

20 Claims, 10 Drawing Sheets (58) Field of Classification Search
USPC ........ 403/315, 316, 317, 318, 319; 411/347, 411/907, 908; 464/78
See application file for complete search history.

(56) References Cited

U.S. PATENT DOCUMENTS

| | | | |
|---|---|---|---|
| 3,543,599 A * | 12/1970 | Caswell | B64C 13/02 |
| | | | 464/78 |
| 3,844,137 A * | 10/1974 | Zugel | F16D 3/72 |
| | | | 403/291 |
| 5,062,619 A | 11/1991 | Sato | |
| 5,437,133 A * | 8/1995 | Pliml | E06B 3/685 |
| | | | 52/456 |
| 6,230,456 B1 * | 5/2001 | Merchlewitz | E06B 3/685 |
| | | | 411/908 |
| 6,923,593 B2 | 8/2005 | Nussbaum | |
| 8,182,349 B2 * | 5/2012 | Ross | F16D 3/72 |
| | | | 464/78 |
| 8,887,468 B2 | 11/2014 | Håkansson et al. | |
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,714,672 B2 | 7/2017 | Derelöv et al. | |
| 9,723,923 B2 | 8/2017 | Derelöv | |
| 9,726,210 B2 | 8/2017 | Derelöv et al. | |
| 9,945,121 B2 | 4/2018 | Derelöv | |
| 10,034,541 B2 | 7/2018 | Boo et al. | |
| 10,202,996 B2 | 2/2019 | Håkansson et al. | |
| 10,415,613 B2 | 9/2019 | Boo | |
| 10,448,739 B2 | 10/2019 | Derelöv et al. | |
| 10,451,097 B2 | 10/2019 | Brännström et al. | |
| 10,486,245 B2 | 11/2019 | Fridlund | |
| 10,506,875 B2 | 12/2019 | Boo et al. | |
| 10,544,818 B2 | 1/2020 | Fridlund | |
| 10,548,397 B2 | 2/2020 | Derelöv et al. | |
| 10,669,716 B2 | 6/2020 | Derelöv | |
| 10,670,064 B2 | 6/2020 | Derelöv | |
| 10,724,564 B2 | 7/2020 | Derelöv | |
| 10,731,688 B2 | 8/2020 | Brännström et al. | |
| 10,736,416 B2 | 8/2020 | Derelöv et al. | |
| 10,830,266 B2 | 11/2020 | Fridlund | |
| 10,830,268 B2 | 11/2020 | Boo | |
| 10,871,179 B2 | 12/2020 | Håkansson et al. | |
| 10,876,562 B2 | 12/2020 | Pervan | |
| 10,876,563 B2 | 12/2020 | Derelöv et al. | |
| 10,968,936 B2 | 4/2021 | Boo et al. | |
| 11,076,691 B2 | 8/2021 | Boo | |
| 11,083,287 B2 | 8/2021 | Boo et al. | |
| 11,098,484 B2 | 8/2021 | Derelöv | |
| 11,137,007 B2 | 10/2021 | Fridlund | |
| 11,204,051 B2 | 12/2021 | Brännström et al. | |
| 11,246,415 B2 | 2/2022 | Derelöv et al. | |
| 11,272,783 B2 | 3/2022 | Derelöv | |
| 11,326,636 B2 | 5/2022 | Pervan | |
| 11,445,819 B2 * | 9/2022 | Derelöv et al. | F16B 12/24 |
| 11,913,485 B2 * | 2/2024 | Baus | F16B 2/248 |
| 12,018,707 B2 * | 6/2024 | Svensson | F16B 12/26 |
| 2012/0279161 A1 | 11/2012 | Håkansson et al. | |
| 2013/0048632 A1 * | 2/2013 | Chen | F16B 12/26 |
| | | | 220/4.33 |
| 2013/0058707 A1 * | 3/2013 | Wang | F16B 12/12 |
| | | | 403/205 |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0198191 A1 | 7/2015 | Boo | |
| 2016/0007751 A1 | 1/2016 | Derelöv | |
| 2016/0174704 A1 | 6/2016 | Boo et al. | |
| 2016/0270531 A1 | 9/2016 | Derelöv | |
| 2017/0079433 A1 | 3/2017 | Derelöv et al. | |
| 2017/0089379 A1 | 3/2017 | Pervan | |
| 2017/0097033 A1 | 4/2017 | Håkansson et al. | |
| 2017/0159291 A1 | 6/2017 | Derelöv | |
| 2017/0208938 A1 | 7/2017 | Derelöv et al. | |
| 2017/0227031 A1 | 8/2017 | Boo | |
| 2017/0227032 A1 | 8/2017 | Fridlund | |
| 2017/0227035 A1 | 8/2017 | Fridlund | |
| 2017/0234346 A1 | 8/2017 | Fridlund | |
| 2017/0298973 A1 | 10/2017 | Derelöv | |
| 2017/0360193 A1 | 12/2017 | Boo et al. | |
| 2018/0080488 A1 | 3/2018 | Derelöv | |
| 2018/0087552 A1 | 3/2018 | Derelöv et al. | |
| 2018/0112695 A1 | 4/2018 | Boo et al. | |
| 2018/0119717 A1 | 5/2018 | Derelöv | |
| 2018/0202160 A1 | 7/2018 | Derelöv | |
| 2018/0328396 A1 | 11/2018 | Fransson et al. | |
| 2019/0113061 A1 | 4/2019 | Håkansson et al. | |
| 2019/0128334 A1 * | 5/2019 | Pollitt | B32B 5/024 |
| 2019/0166989 A1 | 6/2019 | Boo et al. | |
| 2019/0191870 A1 | 6/2019 | Derelöv | |
| 2019/0195256 A1 | 6/2019 | Derelöv | |
| 2019/0289999 A1 | 9/2019 | Derelöv et al. | |
| 2019/0320793 A1 | 10/2019 | Boo | |
| 2019/0323532 A1 | 10/2019 | Boo | |
| 2019/0323533 A1 | 10/2019 | Boo | |
| 2019/0323534 A1 | 10/2019 | Derelöv | |
| 2019/0323535 A1 | 10/2019 | Derelöv | |
| 2020/0003242 A1 | 1/2020 | Brännström et al. | |
| 2020/0055126 A1 | 2/2020 | Fridlund | |
| 2020/0069048 A1 | 3/2020 | Derelöv et al. | |
| 2020/0069049 A1 | 3/2020 | Derelöv et al. | |
| 2020/0102978 A1 | 4/2020 | Fridlund | |
| 2020/0121076 A1 | 4/2020 | Derelöv et al. | |
| 2020/0214447 A1 | 7/2020 | Derelöv et al. | |
| 2020/0300284 A1 | 9/2020 | Pervan | |
| 2020/0337455 A1 | 10/2020 | Boo et al. | |
| 2020/0340513 A1 | 10/2020 | Derelöv | |
| 2021/0079650 A1 | 3/2021 | Derelöv | |
| 2021/0148392 A1 | 5/2021 | Brännström et al. | |
| 2021/0180630 A1 | 6/2021 | Bruno et al. | |
| 2021/0190112 A1 | 6/2021 | Derelöv | |
| 2021/0207635 A1 | 7/2021 | Håkansson et al. | |
| 2021/0222716 A1 | 7/2021 | Derelöv et al. | |
| 2021/0262507 A1 | 8/2021 | Svensson et al. | |
| 2021/0262508 A1 | 8/2021 | Svensson et al. | |
| 2021/0276108 A1 | 9/2021 | Derelöv et al. | |
| 2021/0285480 A1 | 9/2021 | Derelöv et al. | |
| 2021/0381251 A1 | 12/2021 | Svensson | |
| 2022/0018373 A1 | 1/2022 | Boo | |
| 2022/0049735 A1 | 2/2022 | Meijer | |
| 2022/0186761 A1 | 6/2022 | Derelöv et al. | |
| 2022/0397140 A1 * | 12/2022 | Svensson | F16B 5/0024 |
| 2023/0323910 A1 * | 10/2023 | Svensson | F16B 21/12 |
| | | | 403/326 |
| 2024/0018986 A1 * | 1/2024 | Svensson | F16B 12/24 |

FOREIGN PATENT DOCUMENTS

| | | | | |
|---|---|---|---|---|
| FR | 2404770 | A2 | 4/1979 | |
| GB | 2494462 | A | 3/2013 | |
| GB | 2552970 | A * | 2/2018 | ........... A47B 96/066 |
| IT | 202000900844279 | | 11/2001 | |
| WO | 2020046193 | A1 | 3/2020 | |
| WO | 2020216852 | A1 | 10/2020 | |

OTHER PUBLICATIONS

U.S. Appl. No. 17/883,203, Christian Boo, filed Aug. 8, 2022.
U.S. Appl. No. 17/886,517, Peter Derelöv, filed Aug. 12, 2022.
U.S. Appl. No. 18/191,444, Johan Svensson, filed Mar. 28, 2023.
U.S. Appl. No. 18/312,808, Johan Svensson, filed May 5, 2023.
U.S. Appl. No. 18/383,242, Peter Derelöv, filed Oct. 24, 2023.
U.S. Appl. No. 18/729,224, Johan Svensson, filed Jul. 16, 2024.
U.S. Appl. No. 16/386,732, Christian Boo, filed Apr. 17, 2019, (Cited herein as US Patent Application Publication No. 2019/0323532 A1 of Oct. 24, 2019)
U.S. Appl. No. 16/386,810, Christian Boo, filed Apr. 17, 2019, (Cited herein as US Patent Application Publication No. 2019/0323533 A1 of Oct. 24, 2019).
U.S. Appl. No. 16/553,325, Peter Derelöv and Johan Svensson, filed Aug. 28, 2019, (Cited herein as US Patent Application Publication No. 2020/0069048 A1 of Mar. 5, 2020).

(56) References Cited

OTHER PUBLICATIONS

U.S. Appl. No. 16/553,350, Peter Derelöv and Johan Svensson, filed Aug. 28, 2019, (Cited herein as US Patent Application Publication No. 2020/0069049 A1 of Mar. 5, 2020).

U.S. Appl. No. 16/856,765, Peter Derelöv, filed Apr. 23, 2020, (Cited herein as US Patent Application Publication No. 2020/0340513 A1 of Oct. 29, 2020).

U.S. Appl. No. 17/154,344, Peter Derelöv and Johan Svensson, filed Jan. 21, 2021, (Cited herein as US Patent Application Publication No. 2021/0222716 A1 of Jul. 22, 2021).

U.S. Appl. No. 17/173,823, Peter Derelöv and Johan Svensson, filed Feb. 11, 2021, (Cited herein as US Patent Application Publication No. 2021/0276108 A1 of Sep. 9, 2021).

U.S. Appl. No. 17/185,428, Johan Svensson and Peter Derelöv, filed Feb. 25, 2021, (Cited herein as US Patent Application Publication No. 2021/0262508 A1 of Aug. 26, 2021).

U.S. Appl. No. 17/185,403, Johan Svensson and Peter Derelöv, filed Feb. 25, 2021, (Cited herein as US Patent Application Publication No. 2021/0262507 A1 of Aug. 26, 2021).

U.S. Appl. No. 17/370,521, Christian Boo, filed Jul. 8, 2021 (Cited herein as US Patent Application Publication No. 2022/0018373 A1 of Jan. 20, 2022).

U.S. Appl. No. 17/588,733, Peter Derelöv and Johan Svensson, filed Jan. 31, 2022.

U.S. Appl. No. 17/674,262, Johan Svensson and Peter Derelöv, filed Feb. 17, 2022.

U.S. Appl. No. 17/709,994, Johan Svensson, filed Mar. 31, 2022.

Derelöv, Peter, et al., U.S. Appl. No. 17/588,733 entitled "Arrangements for Preparing of Furniture Product," filed in the U.S. Patent and Trademark Office on Jan. 31, 2022.

Svensson, Johan, et al., U.S. Appl. No. 17/674,262 entitled "Mechanical Connection Arrangement for Panels," filed Feb. 17, 2022.

Svensson, Johan, U.S. Appl. No. 17/709,994 entitled "Mechanical Connection Arrangement for Panels," filed Mar. 31, 2022.

U.S. Appl. No. 18/983,417, Thomas Meijer, filed Dec. 17, 2024.

Supplementary European Search Report issued by the European Patent Office in Application No. 22820653.8 dated Mar. 12, 2025 (8 pages).

Swedish Official Action issued by the Swedish Patent and Registration Office (PRV) in Swedish Patent Application No. 2150753-8 on Feb. 4, 2022 (9 pages).

Supplementary European Search Report issued by the European Patent Office in Application No. 22820654.6 dated Mar. 19, 2025 (9 pages).

U.S. Appl. No. 19/093,758, Peter Derelöv, filed Mar. 28, 2025.

\* cited by examiner

STATIC LOAD COMPRESSION SPRING

CROSS REFERENCE TO RELATED APPLICATIONS

The present application claims the benefit of Swedish Application No. 2150753-8, filed on Jun. 11, 2021. The entire contents of Swedish Application No. 2150753-8 are hereby incorporated herein by reference in their entirety.

TECHNICAL FIELD

Embodiments of the present invention concern a static load compression spring configured to cooperate with a locking pin for locking two components to one another.

BACKGROUND

Assembling two or more objects into one piece, for instance furniture, has historically required tools such as drills, screwdrivers, hammers, and wrenches.

Starting with click floors, assembling not requiring tools has further been developed and many types of furniture in a household could be assembled without tools or at least with a minimum of tools.

When locking two panels to one another a locking device is known comprising a spring at one end and a locking at the other end. The spring end of the locking device is inserted into a recess of one of the panels, leaving the locking pin protruding above the surface of the panel. The other panel has a corresponding recess for receiving the locking pin when the two panels are brought together.

SUMMARY

The present disclosure describes an improved locking device which includes a spring and a locking pin. The spring could be utilized in various situations; however, the present spring is preferably utilized as the spring for a locking pin, but other utilizations are not excluded.

A first aspect of the present disclosure includes a locking device, which comprises a spring, such as a static load compression spring, and a locking pin. The locking device is configured to lock together components, such as furniture components. The spring is a sequence of a first and a second elements, each element comprising a disc-shaped part, wherein two, relative the centre of the disc-shaped part, opposed bridging struts are arranged equally distanced from the centre and on the same side of the disc-shaped part. The elements with said struts are arranged with the disc-shaped parts parallel to one another. The first element is with the struts directed towards the second element and connected with said struts to the second element such that the struts of the second element are pointing away from the first element. A line between the struts of the first element is perpendicular to a line between the struts of the second element.

Depending on the desired compression length, the spring should be made with more of said elements the longer the length of the compression. Due to the mechanics of the spring, when compressed, the spring does not expand radially.

According to a further aspect of the present disclosure, the disc-shaped parts are circular. This type of spring will benefit from being arranged in a recess/hole and these are more easily produced with a circular cross-section by for instance drilling.

According to a further aspect of the present disclosure, the disc-shaped parts have centrally placed, circular openings. The disc-shaped parts could be with these openings considered as ring-shaped elements if the disc-shaped parts are circular as well.

According to another aspect of the present disclosure, the disc-shaped parts are made of a resilient material.

According to yet another aspect of the present disclosure the spring comprises at least 4 elements.

In the spring according to one aspect of the present disclosure, the distance between two adjacent disc-shaped parts is larger than the thickness of a single disc-shaped part.

According to a further aspect of the present disclosure the distance between two adjacent disc-shaped parts is at least 1.5 mm.

The distance between two bridging struts on one disc-shaped part is according to one aspect of the present disclosure between 1.5 and 4 times the distance between two adjacent disc-shaped parts and more preferably between 2 and 3 times the distance between two adjacent disc-shaped parts.

According to an aspect of the present disclosure the disc-shaped elements and the struts are made from the same material. The spring could for instance be moulded or 3D printed.

According to a further aspect of the present disclosure the outer diameter of the disc-shaped part, when the disc-shaped part is circular, is between 1.5 and 3 times as large as the diameter of the opening and more preferably between 1.7 and 2.3 times as large as the diameter of the opening.

According to yet a further aspect of the present disclosure, the disc-shaped part at an end of the spring has two opposed radially projecting parts. These projecting parts may help to keep the spring in a recess rotationally fixed.

According to still another aspect of the present disclosure, the bridging struts have a radius on two opposing sides, the radius being half the distance between the disc-shaped parts adjacent to the struts. A softer transition between the disc-shaped parts and the struts improves the strength of the spring.

According to an alternative aspect of the present disclosure the distance between the disc-shaped parts increases from one end of the spring to the other end.

According to yet an alternative aspect of the present disclosure a thickness on at least a part of the disc-shaped parts decreases from one end of the spring to the other end.

According to yet another aspect of the present disclosure the spring is injection moulded. Thus, the entire spring is made from the same material.

According to yet another aspect of the present disclosure the locking device comprises a polymer material, such as a thermoplastic material, optionally with an enforcement, such as glass fibre.

According to yet another aspect of the present disclosure the spring and the locking pin may be injection moulded in one piece.

According to yet another aspect of the present disclosure an axial hole or recess is slightly conical such that the diameter close to the locking pin end is smaller than the diameter at the end of spring away from the locking pin end which may facilitate the retrieval of a moulding pin.

The increasing angle from one end of the spring to the other may compensate the decreasing diameter to maintain the spring constant throughout the length of the spring.

According to yet another aspect of the present disclosure the thickness of the disc-shaped parts is decreased when the diameter of the axial hole/recess is decreased.

According to yet another aspect of the present disclosure the components are panels, such wood based panels.

According to yet another aspect of the present disclosure the wood based panels are HDF, MDF or plywood panels.

According to yet another aspect of the present disclosure the furniture component may be a part of a furniture product, such as a bookshelf, a cupboard, a wardrobe, a box, a drawer, a kitchen cabinet, a countertop, or a tabletop.

A second aspect of the disclosure includes a set comprising furniture components and the locking device, wherein the furniture components comprise a first panel and a second panel which are locked together by the locking device.

According to a further aspect the locking device cooperates with a first panel recess in the first panel and a second panel recess in the second panel for a locking of the first panel to the second panel.

According to a further aspect the spring cooperates with the first panel recess and the locking pin cooperates with the second panel recess.

It should be emphasized that the term "comprises/comprising" when used in this specification is taken to specify the presence of stated features, integers, steps, or components but does not preclude the presence or addition of one or more other features, integers, steps, components, or groups thereof.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings.

DETAILED DESCRIPTION OF EXEMPLARY EMBODIMENTS

Specific embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings and in the description, like numbers refer to like elements.

Figure 1:
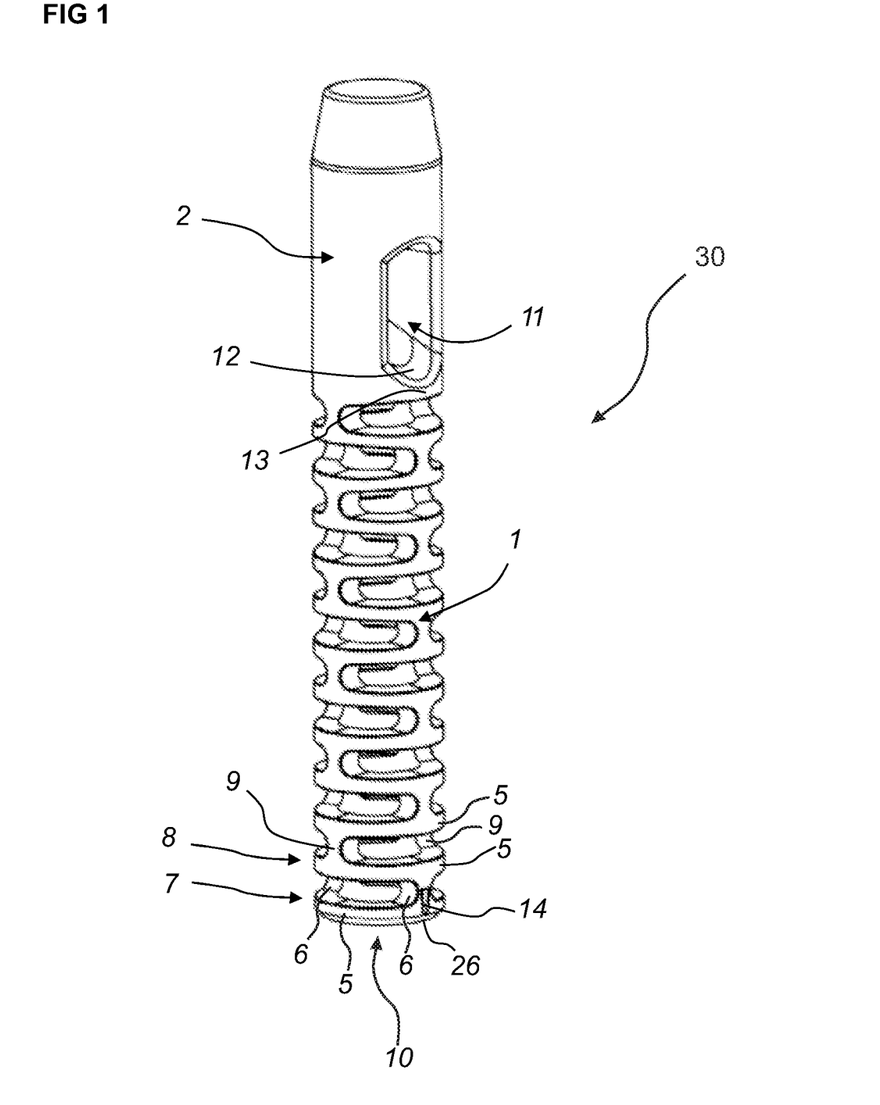
FIG. 1 is a perspective view of a locking device of an embodiment according to the present disclosure.

FIG. 1 shows a locking device 30 which includes a spring, such as a static load compression spring 1, and a locking pin 2. The locking device 30 may be configured for locking two components to one another. As can be seen in the FIG. 1, the spring 1 is a sequence of a first and a second elements 7, 8, wherein each element includes a disc-shaped part 5 and two struts 6 (or two struts 9). The two, relative the centre of the disc-shaped part 5, opposed bridging struts 6, 9 are arranged equally distanced from the centre and on the same side of the disc-shaped part 5. Further, the elements 7, 8 with said struts 6, 9 are arranged with the disc-shaped parts 5 parallel to one another. The first element 7 with the struts 6 directed towards the second element 8 is connected with said struts 6 to the second element 8 with the struts 9 of the second element 8 pointing away from the first element 7 and towards the next element. A straight line between the struts 6 of the first element 7 is perpendicular to the line between the struts 9 of the second element 8, when viewed axially.

The disc-shaped parts 5 may be circular or ovular and the disc-shaped parts 5 may have centrally placed, circular (or ovular) openings 10. Thus, the shown spring 1 could be seen as made of a series of circular parts 5 with bridging struts 6, 9.

The circular openings 10 may form an axial hole extending through the spring.

The axial hole or recess may be slightly conical such that the diameter d close to the end of the locking pin 2 is smaller than the diameter D at the end of spring away from the locking pin end 2. For example, D may be 1.05 to 2 times the size of d, such as 1.1 to 1.5 times, such as about 1.3.

In the shown embodiment, there are 12 elements but depending on where the spring should be used, any number of elements could be considered, such as 3-20, such as 5-15.

An axial distance 51 between two adjacent disc-shaped parts 5 may be larger than an axial thickness 52 of a single disc-shaped part 5.

In one example embodiment, the bridging struts 6, 9 on one disc-shaped part may be separated by the axial hole, thus the bridging struts on one disc-shaped part may be separated by a bridging struts distance which may be equal to the diameter d/D of the axial hole at the bridging struts.

The bridging struts distance in a radial direction may be between 1.5 and 4 times the axial distance 51 between two adjacent disc-shaped parts 5 and more preferably between 2 and 3 times the axial 51 distance between two adjacent disc-shaped parts 5.

The axial distance 51 between two adjacent disc-shaped parts 5 may be at least 1.5 mm, such as a 1.5-8 mm, such as 1.5-4 mm.

As also can be seen, the disc-shaped elements 5 and the struts 6, 9 together with the locking pin 2 may be made from the same material. The spring could, for instance, be injection moulded.

Further, the disc-shaped part 5, at an end of the spring, may have at least two opposed radially projecting parts 14. When the spring is inserted in a hole/recess in a panel, the spring with these projecting parts 14 may exhibit a rotational resistance, due to contact between the projecting parts 14 and the hole/recess.

Figure 2:
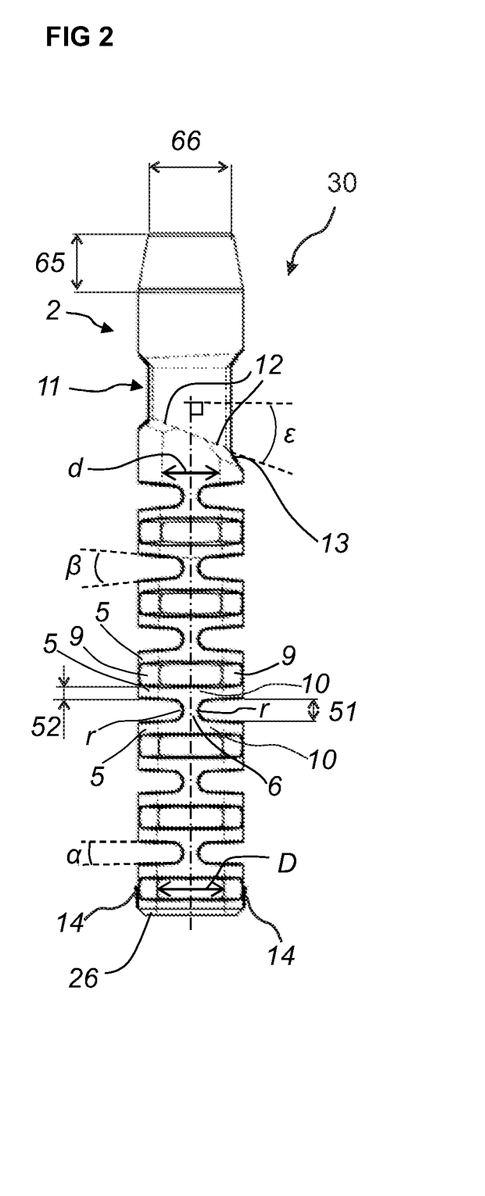
FIG. 2 is a side view of the locking device of FIG. 1.

Turning to FIG. 2, the bridging struts 6, 9 may have a concave surface and an opposite concave surface. The concave surface and the opposite concave surface may extend between two adjacent disc-shaped parts 5. The concave surface and the opposite concave surface may have a curved surface with a radius r. The radius r may be about half the distance 51 between the adjacent disc-shaped parts 5 adjacent to the struts 6, 9.

The axial distance 51 between the disc-shaped parts 5 may increase from one end of the spring 1 to the other end. For example, the axial distance may be greater at the end with the locking pin 2, or vice-versa.

Also, the axial thickness 52 on at least a part of the disc-shaped parts 5 may decrease from one end of the spring 1 to the other end.

The axial thickness 52 of the disc-shaped parts 5 is measured at a lateral surface of the spring 2 approximately midway between struts 6 on one side and struts 9 on another side.

This could also be seen in an increasing angle between the disc-shaped parts 5 from one end of the spring to the other. For example, an angle α between the second and the third disc-shaped parts 5 may be close to zero degrees, such as 0-5 degrees. The angle may increase upwards, such as linearly increase upwards, such that an angle β between two adjacent disc-shaped parts 5 at an end of the spring 2 close to the locking pin 2 may be greater than an angle α at the other end of the spring. The angle between each successive disc shaped parts 5 may increase.

The spring may be injection moulded and the slightly conical shape may facilitate the retrieval of a moulding pin.

The locking device 30 may comprise a polymer material, such as a thermoplastic material, optionally with an enforcement, such as glass fibre.

The spring 1 and the locking pin 2 may be injection moulded in one piece.

The increasing angle from α to β may be configured to compensate for the diameter decreasing from D to d. A smaller angle may allow for more material in the disc shaped part 5.

The axial thickness 51 of the disc-shaped parts is measured at the thinnest part of the disc-shaped parts. The axial thickness 51 of the disc-shaped parts 5 may decrease when the diameter of the axial hole/recess is decreased. This may have the effect that the spring constant throughout the length of the spring is essentially constant, such as not varying more than 20% throughout the length.

An advantage with an embodiment of the spring 1 may be that an outer diameter 67 of the spring does not increase, or that an increase of the outer diameter 67 is insignificant, such as less than 0.3 mm, when the spring 1 is compressed. This may have the effect that the spring 1 when inserted in e.g. a hole 21 is not pinched in the hole 21 when the spring is compressed.

The lateral surface of the locking pin may comprise a radially extending recess 11, the recess 11 having an inner sloping surface 12 axially towards the locking pin end and starting at an axial point 13 at the side of the recess opening closest to the end with the spring of the locking pin. The sloping surface angle ε may be 15-45 degrees, such as 20-40 degrees, such as about 30 degrees, as seen from the side of the locking pin 2.

Figure 3:
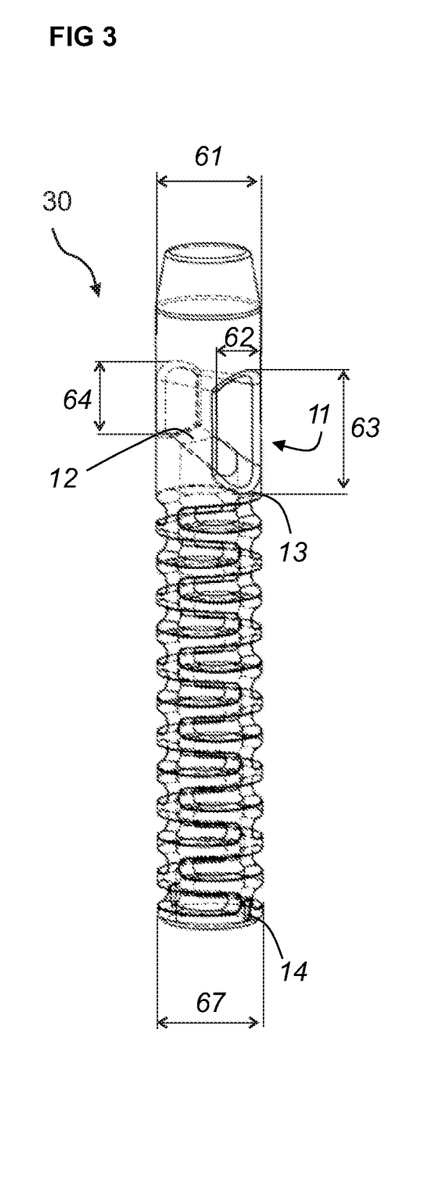
FIG. 3 is a cross sectional perspective view of the locking device of FIGS. 1 and 2.
Figure 4:
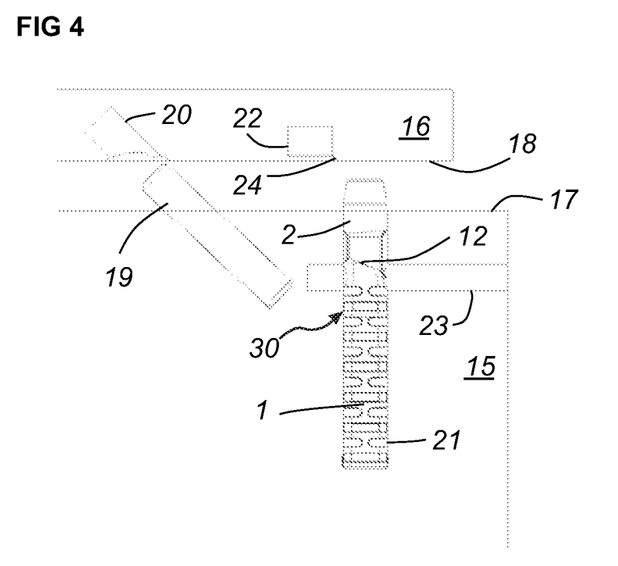
FIG. 4 to FIG. 9 show in sequence the attaching of one panel to another panel with an embodiment of the locking device.

In FIG. 3, it is shown more clearly that the recess 11 may be a through hole such that there is a recess opening and a recess exit.

Also, the leading end of the spring 1 may have a beveled edge 26 so as to facilitate the insertion of the spring 2 of the locking device 30 into a first panel recess 21 in a first panel 15.

The first panel recess 21 may be a cylindrical hole, such as a drill hole.

As an example on how the spring could be utilized reference is now made to FIG. 4 to FIG. 15D.

FIGS. 4-9 show the process of connecting two components, such as panels, to one another. Thus, there is a first panel 15, a second panel 16 wherein a surface 17 of the first panel 15 and a surface 18 of the second panel 16 are parallel and in contact in a locked position of the first and second panels 15, 16. The connection arrangement comprises at least one rod-shaped element 19 at said surface 17 of the first panel 15 and at least one corresponding insertion recess 20 at said surface 18 of the second panel 16.

The first panel 15 and/or the second panel 16 may be a wood based panel.

The wood based panel may be an HDF, a MDF or a plywood panel.

The furniture component may be a part of a furniture product, such as a bookshelf, a cupboard, a wardrobe, a box, a drawer, a kitchen cabinet, a countertop, or a tabletop.

The rod-shaped element 19 is configured to be inserted in the insertion recess 20. The rod-shaped element 19 extends at a first angle from the surface 17 of the first panel 15 and the insertion recess 20 extends into the second panel 16 at a second angle from the surface 18 of the second panel 16. Both the first and second angles may be about 30 to about 60 degrees, such as 35-55 degrees, such as about 45 degrees. The connection arrangement comprises a locking device 30 having a spring 1 at one end and a locking pin 2 at the other end.

The spring 2 is arranged in a first panel recess 21 in one of the panels 15, 16 in a range from 85 to 95 degrees relative said contact surface between the two panels 15, 16 and arranged with the locking pin 2 to fit in a second panel recess 22 in the other panel 15, 16 when the arrangement is in a connected state. The end of the locking pin 2 may be a truncated cone and the end surface of the locking pin being the top-surface of the truncated cone.

The second panel recess 22 may be a cylindrical hole, such as a drill hole.

Figure 5:
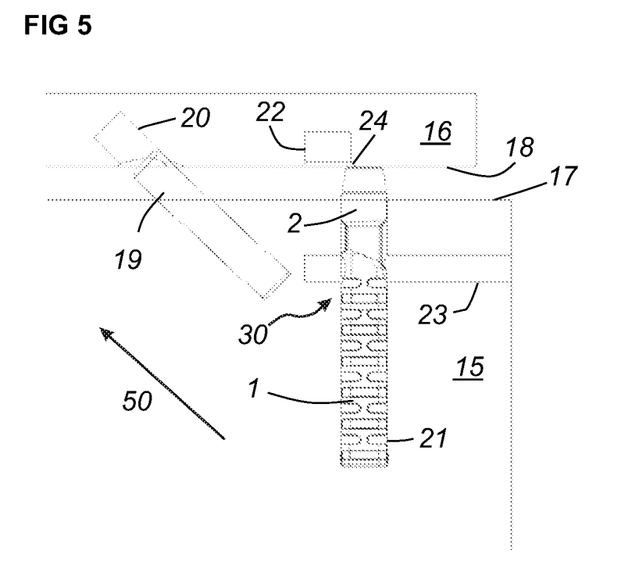

In one embodiment of the connecting arrangement the panels 15, 16 are brought closer together such that the rod-shaped element and the corresponding recess in the other panel are aligned. At one point, as shown in FIG. 5, the second panel 16 is in contact with the top of the locking pin 2.

The process of connecting the first panel 15 to the second panel 16 includes a displacement of the first panel relative the second panel in a direction 50 which parallel to a longitudinal centre axis of the rod-shaped element 19 and a compression of the spring.

Figure 6:
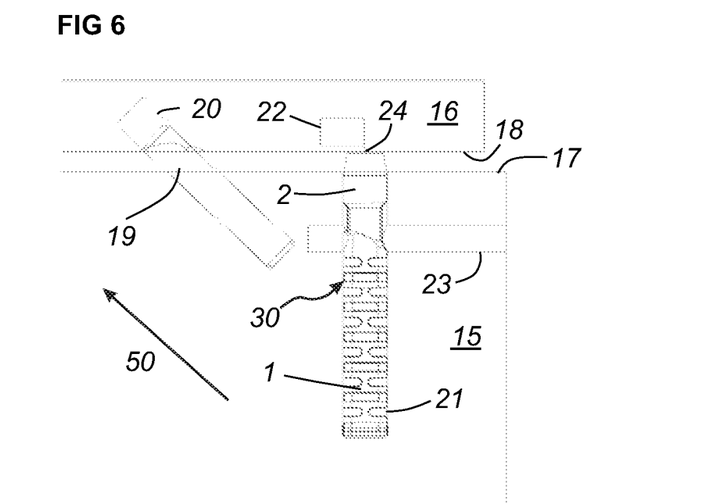
Figure 7:
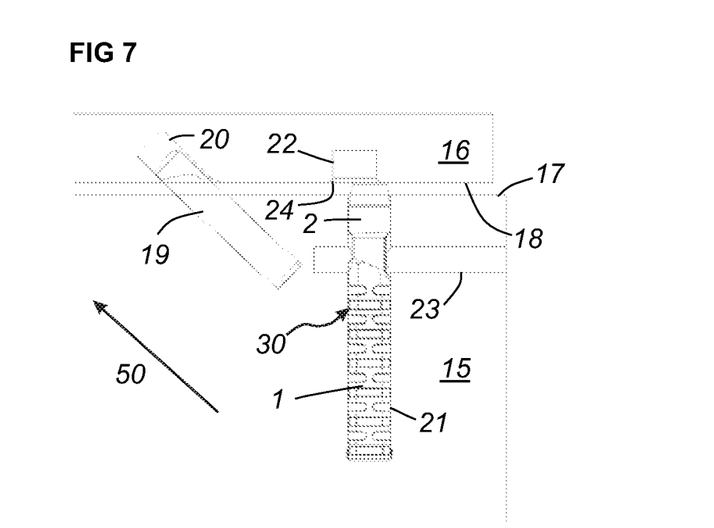
Figure 8:
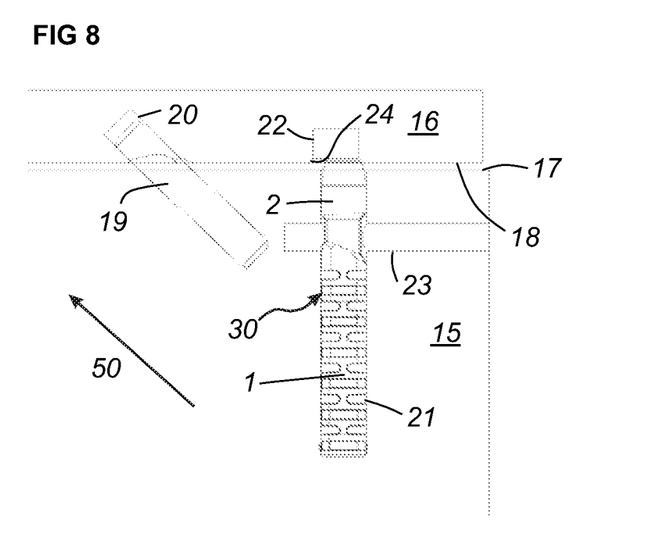

As shown in FIG. 6 the panels 15, 16 are closer and the spring 1 is slightly compressed and in FIGS. 7 and 8 the end 2 of the locking pin is coming closer to be aligned with the second panel recess 22.

Figure 9:
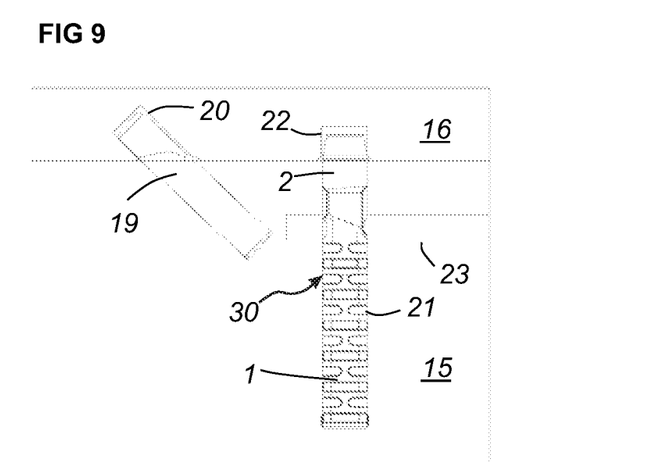

Finally in FIG. 9, the locking pin 2 has snapped into the second panel recess 22 and the two panels 15, 16 are connected to one another.

Figure 10:
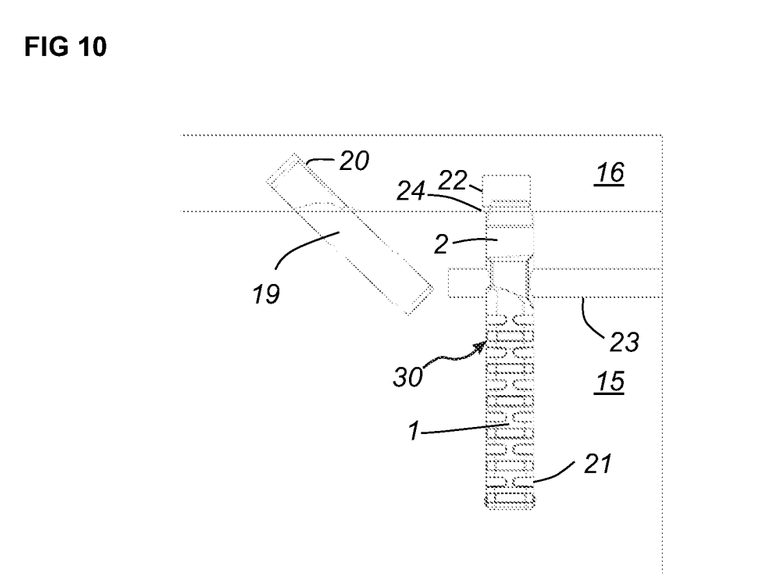
FIG. 10 is a side view of a connection arrangement according to an embodiment.
Figure 11:
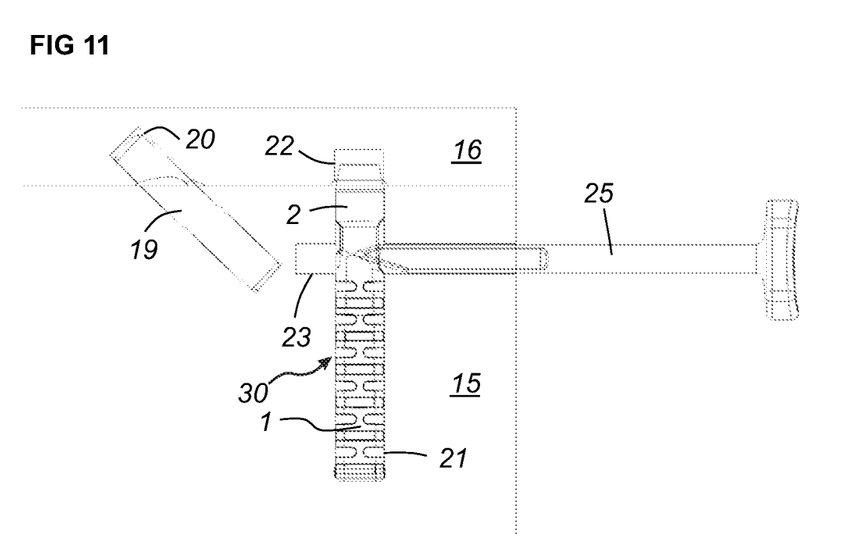
FIG. 11 to FIG. 14 show in sequence the unlocking of a connection arrangement.

In FIG. 10, an advantage of the truncated cone at the end of the locking pin 2 is shown. As can be seen the locking pin 2 and the second panel recess 22 is not completely aligned. Even with such a misalignment, due to the truncated cone of the pin 2, the two panels 15, 16 are locked to one another.

To further facilitate the connection, the second panel recess 22 may have a beveled opening edge 24 along at least part of its circumference, such as the entire circumference.

The second panel 16 may comprise a layer of higher density material at the surface 18. The layer may increase the locking strength of the locking device.

The difference between the first angle and the second angle is between 0.5 and 3 degrees, preferably less than 2 degrees.

The slant angle of the truncated cone may be 5 to 15 degrees, such as about 8-12 degrees, such as about 10 degrees in the shown embodiment. The truncated cone may be a right cone. The centre axis of the locking pin may be perpendicular to the contact surface between the panels 15, 16.

The slant height 65 of the truncated cone may be at least 40% of the top surface diameter 66, such as 40% to 200%, such as 40% to 100%.

The truncated cone may be symmetric.

The lateral surface of the locking pin end has a radially extending recess 11, the recess having an inner sloping surface 12 axially towards the locking pin end 2 and starting at an axial point 13 at the side of the recess opening closest to the end with the spring 1 of the locking pin, see FIGS. 1-3.

The recess 11 in the locking pin end may be a through hole such that there is a recess opening and a recess exit.

A width 62 of the recess 11 of the locking pin 2 may be between 30% and 70% of a diameter 61 of the locking pin 2, such as between 40% and 60% of the diameter 61 of the locking pin 2.

A height 63 of the recess opening, in the axial direction, may be from 1.6 to 2.5, such as about 2, times as large as a height 64 of the recess exit on the opposite side of the locking pin 2.

The panel 15 with the first panel recess 21 has a service recess 23 in a direction perpendicular to the first panel recess 21 and arranged such that the two recesses 21, 23 connect at a distance below said contact surface of the panel 15. The service recess 23 further extends beyond the first panel recess 21 such that the two recesses 21, 23 cross.

Figure 12:
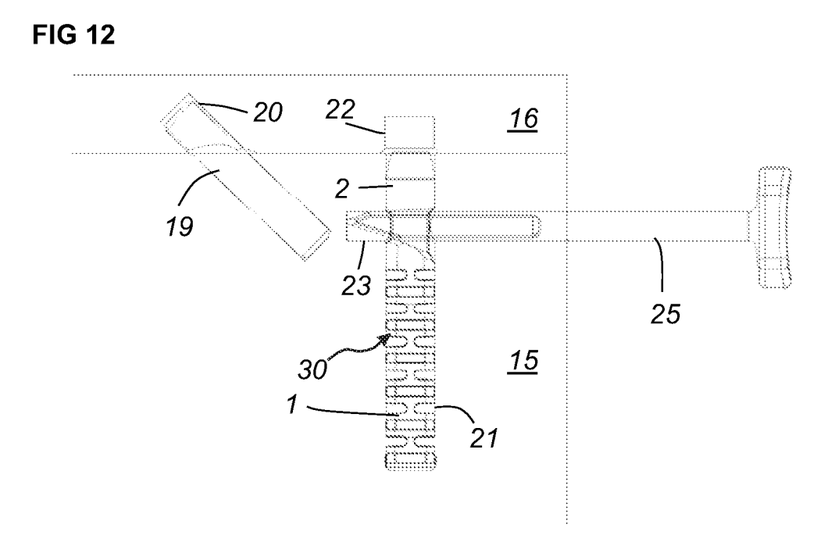
Figure 13:
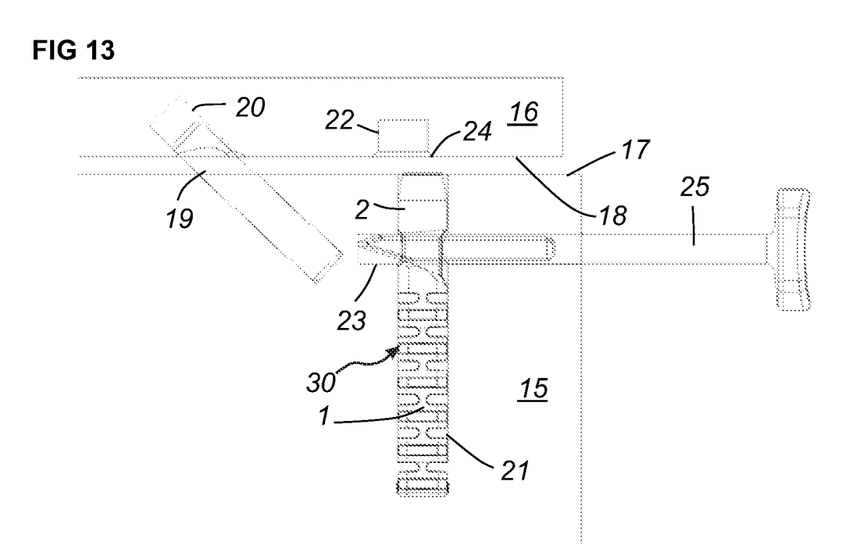
Figure 14:
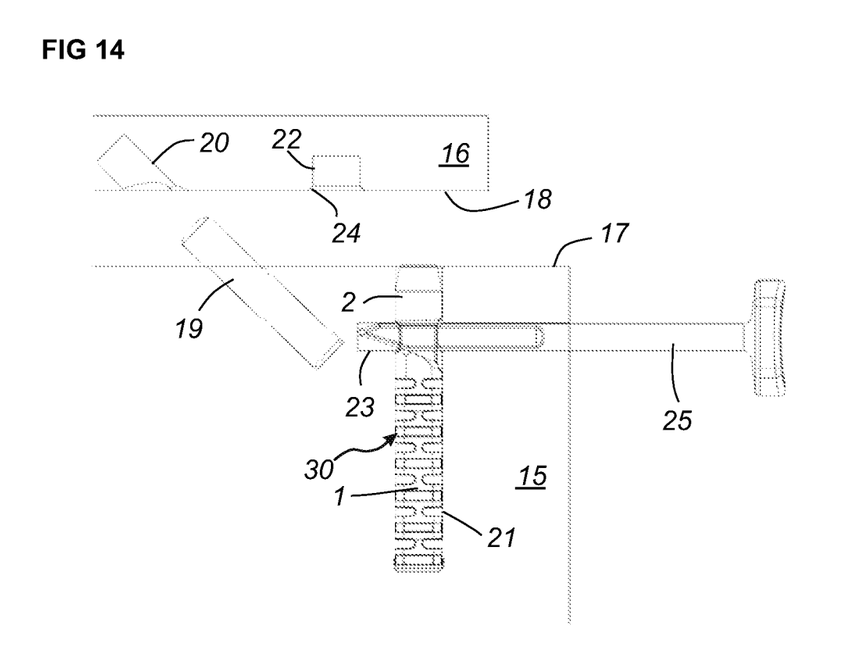

In FIGS. 11 to 14, the unlocking or disassembling of the connection arrangement is shown. A tool 25 is inserted in the service recess 23. The tool may have a similar angle on its tip to the angle E on the sloping surface 12 of the recess through the locking pin 2. The further the tool 25 is pushed into the service recess 23, the more the spring is compressed until the tool 25 is pushed entirely through the recess as shown in FIGS. 12 to 14 when the panels 15, 16 can be pulled apart. Since the service recess 23 passes the panel recess 21, the tool 25 does not need to be held, i.e., the tool 25 stays in this position.

Figure 15A:
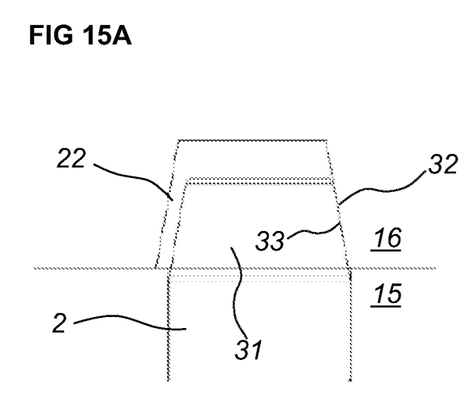
FIGS. 15A-15D is side views of an alternative embodiment of parts of the arrangement.

FIG. 15A shows an alternative embodiment of the second panel recess 22 comprising a conical shape corresponding to the truncated cone of the locking pin 2. Thus, the contact surface is increased between the locking pin 2 and the second panel recess 22.

Figure 15B:
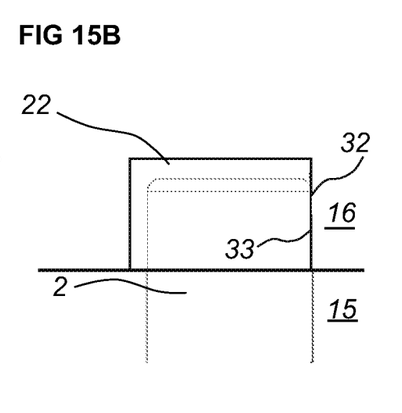

FIG. 15B shows an alternative embodiment of the end of the locking pin 2 comprising a cylindrical shape which is configured to cooperate with the second panel recess 22 have a cylindrical shape.

Figures 15C, 15D, 16:
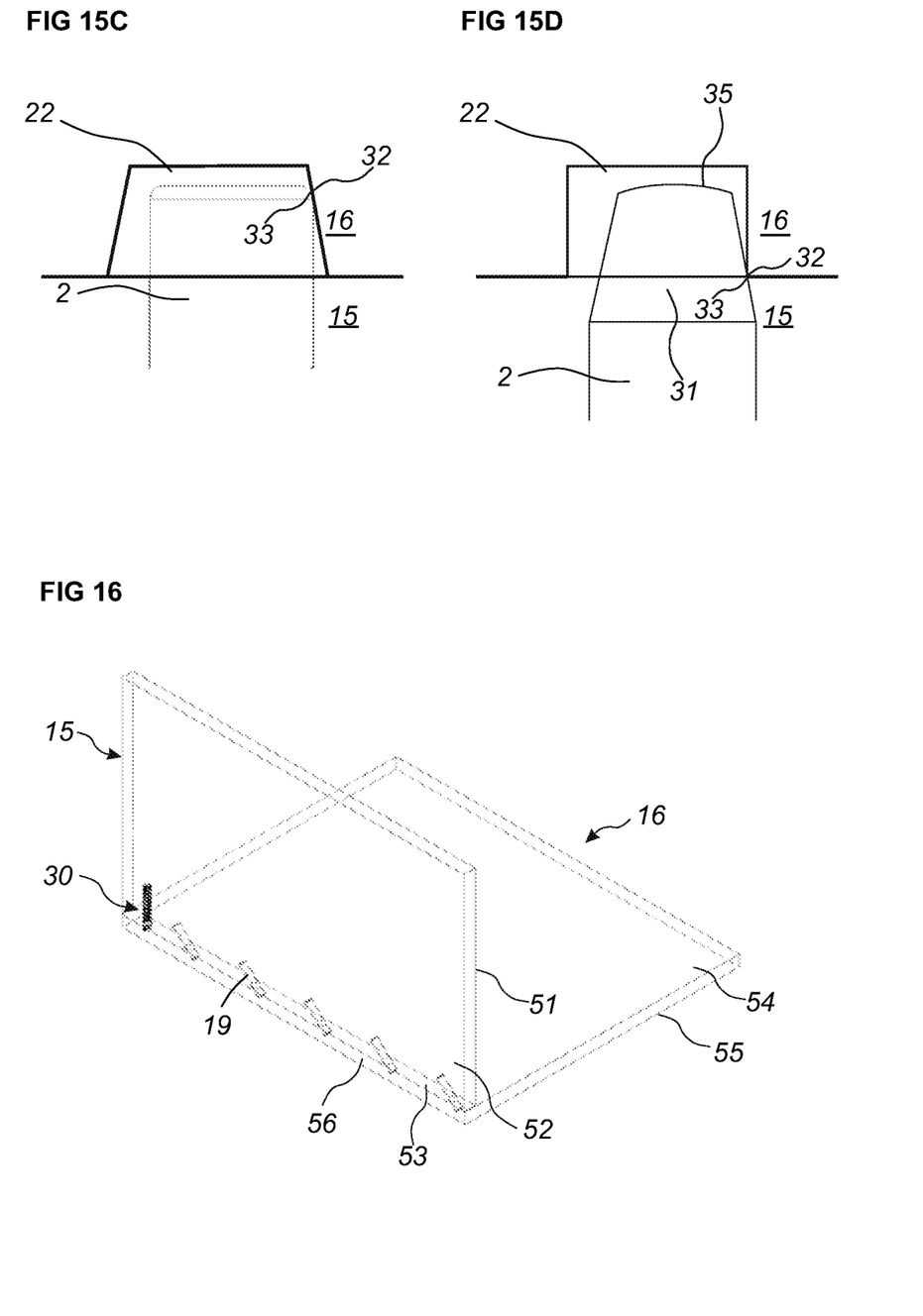
FIG. 16 is a perspective view of two panels joined with a connection arrangement.

FIG. 15C shows an alternative embodiment of the end of the locking pin 2 comprising a cylindrical shape which is configured to cooperate with the second panel recess 22 comprising a conical shape.

FIG. 15D shows an alternative embodiment of the locking pin 2 which comprises a top surface 35. The top surface 35 has a rounded shape which may facilitate the process of connecting the panels 15, 16 to one another. The rounded top surface 35 may have the effect of less friction when the top surface is displaced along and relative the surface of the second panel. The rounded top surface 35 may facilitate snapping in of the locking pin 2 into the second panel recess 22. The rounded stop surface may be combined with any of the other disclosed embodiments herein.

For context purpose, FIG. 16 shows an example of two panels 15, 16 connected using the above mentioned connection arrangement.

The first panel 15 may comprise a main surface 51, a parallel and opposite main surface 52 and an edge surface 53 extending between the main surface 51 and the opposite main surface 52.

The second panel 16 may comprise a main surface 54, a parallel and opposite main surface 55 and an edge surface 56 extending between the main surface 54 and the opposite main surface 55.

The main surface 51 of the first panel 15 and the main surface 54 of the second panel 16 may be perpendicular to each other in the locked position of the first panel 15 and the second panel 16.

The edge surface 53 of the first panel 15 and a main surface 54 of the second panel 16 may be parallel and in contact in the locked position of the first and second panels 15, 16.

The edge surface 56 of the second panel 16 may be parallel in the locked position with the main surface 51 of the first panel 51.

Figure 17:
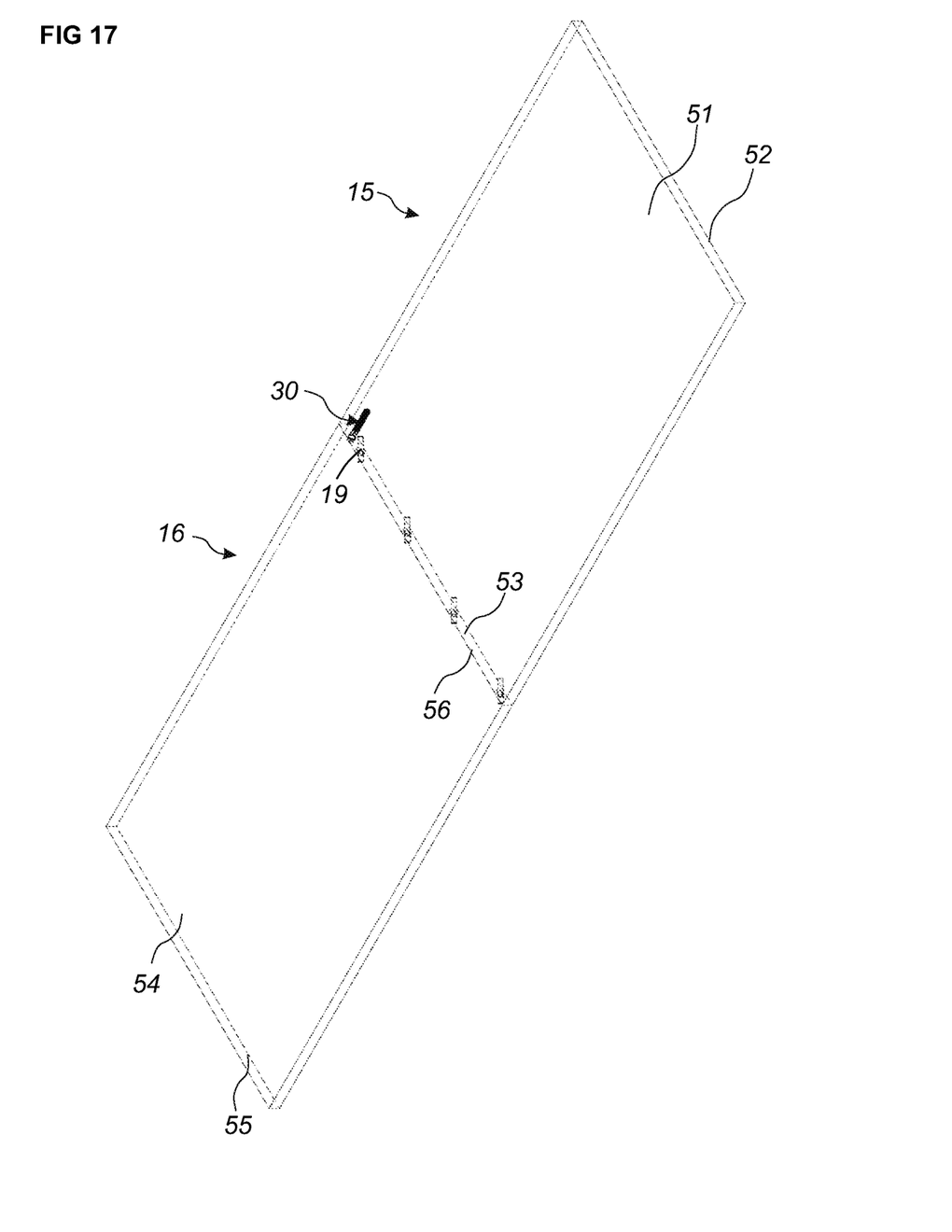
FIG. 17 is a perspective view of two panels joined with a connection arrangement.

For context purpose, FIG. 17 shows an example of two panels 15, 16 connected using the above mentioned connection arrangement.

The first panel 15 may comprise a main surface 51, a parallel and opposite main surface 52 and an edge surface 53 extending between the main surface 51 and the opposite main surface 52.

The second panel 16 may comprise a main surface 54, a parallel and opposite main surface 55 and an edge surface 56 extending between the main surface 54 and the opposite main surface 55.

The main surface 51 of the first panel 15 and the main surface 54 of the second panel 16 may be parallel to each other in the locked position of the first panel 15 and the second panel 16.

The edge surface 53 of the first panel 15 and the edge surface 56 of the second panel 16 may be parallel and in contact in the locked position of the first and second panels 15, 16.

The example in FIG. 17 may two panels locked to each other to obtain a countertop or a tabletop.

The recesses 20, 21, 22, 23 in the panels 15, 16 may be machine processed.

Further, as best shown in FIGS. 1-3, the locking device 30 may have two opposed radially projecting parts 14 at the end of the spring 2 farthest away from the locking pin end 2 for minimizing the risk of the locking pin 2 turning such that a tool 25 cannot be inserted in the locking pin recess 11.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

As used herein, the term "about" means±10% of the noted value. By way of example only, an angle of "about 50 degrees" could include from 45 degrees up to and including 55 degrees.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teaching of the present invention is/are used.

The indefinite articles "a" and "an," as used herein in the specification and in the claims, unless clearly indicated to the contrary, should be understood to mean "at least one."

Further embodiments are described below:

1. A static load compression spring 1 configured for cooperating with a locking pin 2 for locking two elements 3, 4 to one another, wherein the spring 1 is a sequence of a first and a second elements 7, 8, each element comprising a disc-shaped part 5, wherein two relative the centre of the disc-shaped part 5 opposed bridging struts 6, 9 are arranged equally distanced from the centre and on the same side of the disc-shaped part 5, wherein the elements 7, 8 with said struts 6 are arranged with the disc-shaped parts 5 parallel to one another, and wherein the first element 7 with the struts 6 directed towards the second element 8 is connected with said struts 6 to the second element 8, with the struts 9 of the second element 8 pointing away from the first element 7, wherein a line between the struts 6 of the first element 7 is perpendicular to a line between the struts 9 of the second element 8.

2. The spring 1 according to embodiment 1, wherein the disc-shaped parts 5 are circular.

3. The spring 1 according to embodiment 1 or 2, wherein the disc-shaped parts 5 have centrally placed, circular openings 10.

4. The spring 1 according to any of the preceding embodiments, wherein the disc-shaped parts 5 are made of a resilient material.

5. The spring 1 according to any of the preceding embodiments, comprising at least 4 elements 7, 8.

6. The spring 1 according to any of the preceding embodiments, wherein the distance between two adjacent disc-shaped parts 5 is larger than the thickness of a single disc-shaped part 5.

7. The spring 1 according to any of the preceding embodiments, wherein the distance between two adjacent disc-shaped parts 5 is at least 1.5 mm.

8. The spring 1 according to any of the preceding embodiments, wherein the distance between two bridging struts 6, 9 on one disc-shaped part is between 1.5 and 4 times the distance between two adjacent disc-shaped parts 5 and more preferably between 2 and 3 times the distance between two adjacent disc-shaped parts 5.

9. The spring 1 according to any of the preceding embodiments, wherein the disc-shaped elements 5 and the struts 6, 9 are made from the same material.

10. The spring 1 according to embodiments 2 and 3, wherein the outer diameter 67 of the disc-shaped part 5 is between 1.5 and 3 times as large as the diameter of the opening 10 and more preferably between 1.7 and 2.3 times as large as the diameter of the opening 10.

11. The spring 1 according to any of the embodiments 2-10, wherein the disc-shaped part 5 at an end of the spring has two opposed radially projecting parts 14.

12. The spring 1 according to any of the preceding embodiments, wherein the bridging struts 6, 9 have a radius r on two opposing sides, the radius r being half the distance 51 between the disc-shaped parts 5 adjacent to the struts 6, 9.

13. The spring 1 according to any of the preceding embodiments, wherein the distance 51 between the disc-shaped parts 5 increases from one end of the spring 1 to the other end.

14. The spring 1 according to any of the preceding embodiments, wherein a thickness on at least a part of the disc-shaped parts 5 decreases from one end of the spring 1 to the other end.

15. The spring 1 according to any of the preceding embodiments, wherein the spring 1 is injection moulded.

The invention claimed is:

1. A locking device configured to lock together furniture components,
   wherein the locking device has a main longitudinal axis defining a total height of the locking device extending from a first end surface of the locking device to a second end surface of the locking device,
   wherein the locking device comprises a spring and a locking pin,
   wherein the spring is a sequence, along the main longitudinal axis, of a first and a second elements, each element comprising a disc-shaped part and two, relative the center of the disc-shaped part, opposed bridging struts,
   wherein the two opposed bridging struts are arranged equally distanced from the center and on the same side of the disc-shaped part,
   wherein the elements with said struts are arranged with the disc-shaped parts parallel to one another,
   wherein the first element with the struts directed towards the second element is connected with said struts to the second element, with the struts of the second element pointing away from the first element,
   wherein a line between the struts of the first element is perpendicular to a line between the struts of the second element, when viewed axially, and
   wherein the first end surface of the locking device is a surface of one of the disc-shaped parts.

2. The locking device according to claim 1, wherein the disc-shaped parts are circular.

3. The locking device according to claim 2, wherein the disc-shaped parts have centrally placed, circular openings.

4. The locking device according to claim 3, wherein the outer diameter of the disc-shaped part is between 1.5 and 3 times as large as the diameter of the opening.

5. The locking device according to claim 2, wherein the disc-shaped part at an end of the spring has two opposed radially projecting parts.

6. The locking device according to claim 1, wherein the disc-shaped parts are made of a resilient material.

7. The locking device according to claim 1, comprising at least 4 elements.

8. The locking device according to claim 1, wherein an axial distance between two adjacent disc-shaped parts is larger than an axial thickness of a single disc-shaped part.

9. The locking device according to claim 1, wherein an axial distance between two adjacent disc-shaped parts is at least 1.5 mm.

10. The locking device according to claim 1, wherein the distance in a radial direction between two bridging struts on one disc-shaped part is between 1.5 and 4 times the axial distance between two adjacent disc-shaped parts.

11. The locking device according to claim 1, wherein the disc-shaped elements and the struts are made from the same material.

12. The locking device according to claim 1, wherein each of the bridging struts comprises a concave surface and an opposite concave surface, wherein the concave surface and/or the opposite concave surface extends between two adjacent disc-shaped parts, wherein the concave surface and/or the opposite concave surface comprises a curved surface with a radius, the radius being half the distance between the disc-shaped parts adjacent to the struts.

13. The locking device according to claim 1, wherein the spring is injection molded.

14. The locking device according to claim 1, wherein the locking device comprises a polymer material, optionally with an enforcement.

15. The locking device according to claim 1, wherein the spring and the locking pin are injection molded in one piece.

16. A set comprising furniture components and the locking device according to claim 1, wherein the furniture components comprise a first panel and a second panel which are locked together by the locking device.

17. The set as claimed in claim 16, wherein the locking device cooperates with a first panel recess in the first panel and a second panel recess in the second panel for a locking of the first panel to the second panel.

18. The set as claimed in claim 17, wherein the spring cooperates with the first panel recess and the locking pin cooperates with the second panel recess.

19. A locking device configured to lock together furniture components,
wherein the locking device comprises a spring and a locking pin,
wherein the spring is a sequence of a first and a second elements, each element comprising a disc-shaped part and two, relative the center of the disc-shaped part, opposed bridging struts,
wherein the two opposed bridging struts are arranged equally distanced from the center and on the same side of the disc-shaped part,
wherein the elements with said struts are arranged with the disc-shaped parts parallel to one another,
wherein the first element with the struts directed towards the second element is connected with said struts to the second element, with the struts of the second element pointing away from the first element,
wherein a line between the struts of the first element is perpendicular to a line between the struts of the second element, when viewed axially, and
wherein an axial distance between the disc-shaped parts increases from one end of the spring to the other end.

20. A locking device configured to lock together furniture components,
wherein the locking device comprises a spring and a locking pin,
wherein the spring is a sequence of a first and a second elements, each element comprising a disc-shaped part and two, relative the center of the disc-shaped part, opposed bridging struts,
wherein the two opposed bridging struts are arranged equally distanced from the center and on the same side of the disc-shaped part,
wherein the elements with said struts are arranged with the disc-shaped parts parallel to one another,
wherein the first element with the struts directed towards the second element is connected with said struts to the second element, with the struts of the second element pointing away from the first element,
wherein a line between the struts of the first element is perpendicular to a line between the struts of the second element, when viewed axially, and
wherein an axial thickness on at least a part of the disc-shaped parts decreases from one end of the spring to the other end.

* * * * *